(12) United States Patent
Fujishiro

(10) Patent No.: US 10,123,318 B2
(45) Date of Patent: Nov. 6, 2018

(54) COMMUNICATION CONTROL METHOD, BASE STATION, AND USER TERMINAL

(71) Applicant: KYOCERA CORPORATION, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 51 days.

(21) Appl. No.: 15/308,718

(22) PCT Filed: Apr. 30, 2015

(86) PCT No.: PCT/JP2015/062930
§ 371 (c)(1),
(2) Date: Nov. 3, 2016

(87) PCT Pub. No.: WO2015/170655
PCT Pub. Date: Nov. 12, 2015

(65) Prior Publication Data
US 2017/0195996 A1 Jul. 6, 2017

(30) Foreign Application Priority Data

May 7, 2014 (JP) .................. 2014-095880

(51) Int. Cl.
*H04W 72/04* (2009.01)
*H04W 76/10* (2018.01)
(Continued)

(52) U.S. Cl.
CPC ......... *H04W 72/042* (2013.01); *H04W 24/02* (2013.01); *H04W 24/10* (2013.01);
(Continued)

(58) Field of Classification Search
None
See application file for complete search history.

(56) References Cited

U.S. PATENT DOCUMENTS

| 2015/0111580 A1* | 4/2015 | Wu | H04W 36/0005 455/436 |
|---|---|---|---|
| 2015/0133122 A1* | 5/2015 | Chen | H04W 76/025 455/436 |
| 2015/0146562 A1* | 5/2015 | Sivanesan | H04L 5/0032 370/252 |

FOREIGN PATENT DOCUMENTS

EP 2 884 688 A1 6/2015

OTHER PUBLICATIONS

ITRI, "Further Discussion on RLF Handling in Dual Connectivity," 3GPP TSG-RAM WG2 Meeting #85bis, R2-141345, Mar. 31, 2014 to Apr. 4, 2014, Valencia, Spain, 4 pp.
(Continued)

*Primary Examiner* — Vinncelas Louis
(74) *Attorney, Agent, or Firm* — Studebaker & Brackett PC

(57) ABSTRACT

A communication control method according to one embodiment includes controlling a dual connectivity communication using a master base station configured to establish an RRC connection with a user terminal and a secondary base station configured to provide additional radio resources to the user terminal. The controlling includes the steps of: detecting, by the user terminal, a radio link failure between the user terminal and the secondary base station; reporting, by the user terminal, the radio link failure to the master base station; and transmitting, by the master base station, a stop instruction signal to the secondary base station.

13 Claims, 8 Drawing Sheets

(51) Int. Cl.
*H04W 92/20* (2009.01)
*H04W 76/15* (2018.01)
*H04W 76/18* (2018.01)
*H04W 24/02* (2009.01)
*H04W 24/10* (2009.01)
*H04W 76/34* (2018.01)
*H04L 1/18* (2006.01)
*H04W 76/19* (2018.01)

(52) U.S. Cl.
CPC ....... *H04W 72/0426* (2013.01); *H04W 76/10* (2018.02); *H04W 76/15* (2018.02); *H04W 76/18* (2018.02); *H04W 76/34* (2018.02); *H04W 92/20* (2013.01); *H04L 1/188* (2013.01); *H04L 1/1848* (2013.01); *H04L 1/1874* (2013.01); *H04W 76/19* (2018.02)

(56) References Cited

OTHER PUBLICATIONS

Extended European Search Report dated Nov. 17, 2017, from corresponding EP Appl No. 15789386.8, 13 pp.
International Search Report issued in PCT/JP2015/062930; dated Jul. 7, 2015.
Written Opinion issued in PCT/JP2015/062930; dated Jul. 7, 2015.
3rd Generation Partnership Project; Technical Specification Group Radio Access Network; Study on Small Cell enhancements for E-UTRA and E-UTRAN; Higher layer aspects; 3GPP TR 36.842 V12.0.0; Dec., 2013; pp. 1-71; Release 12; 3GPP Organizational Partners.
Qualcomm Incorporated; On the RLM requirement for the SeNB; 3GPP TSG-RAN WG2 Meeting #85; R2-140500; Feb. 10-14, 2014; pp. 1-2; Prague, Czech Republic.
Catt et al.; RLM considerations on the special cell of SCG; 3GPP TSG RAN WG2 Meeting #85; R2-140180; Feb. 10-14, 2014; pp. 1-4; Prague, Czech Republic.

* cited by examiner

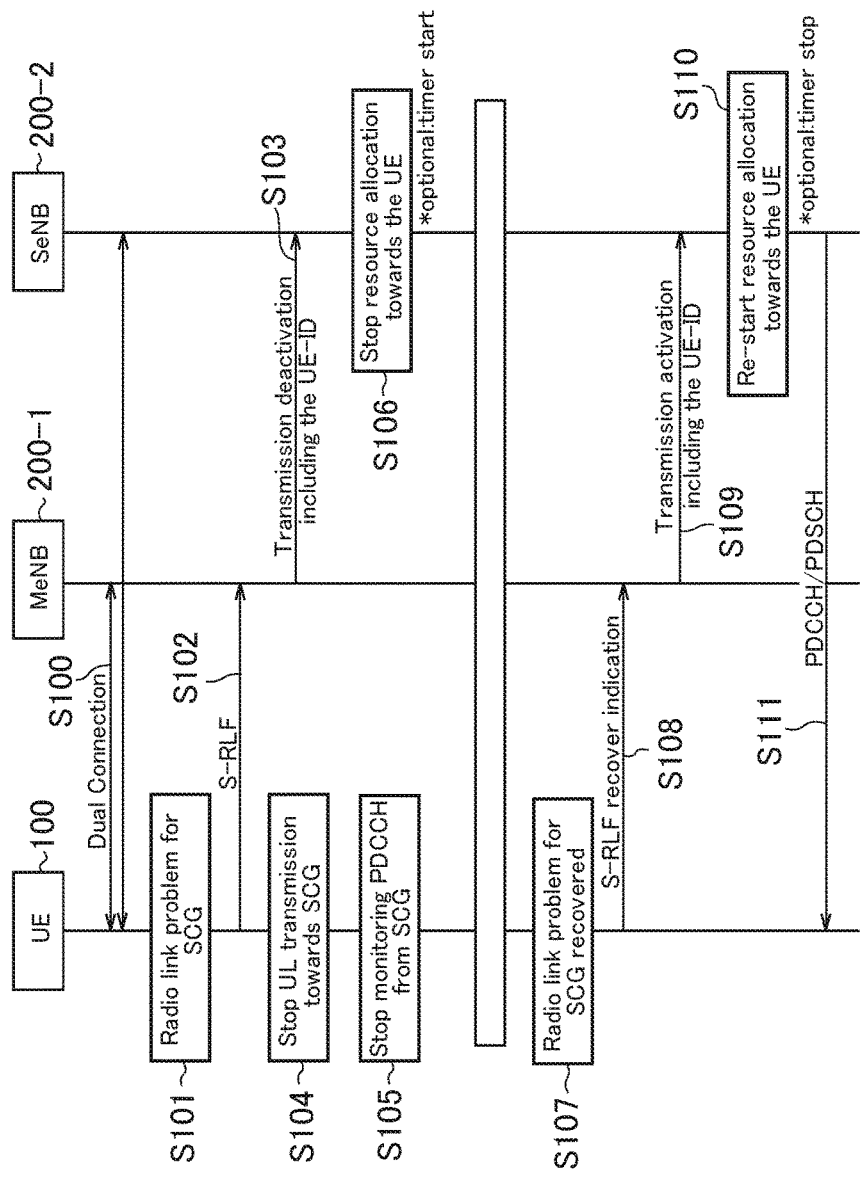

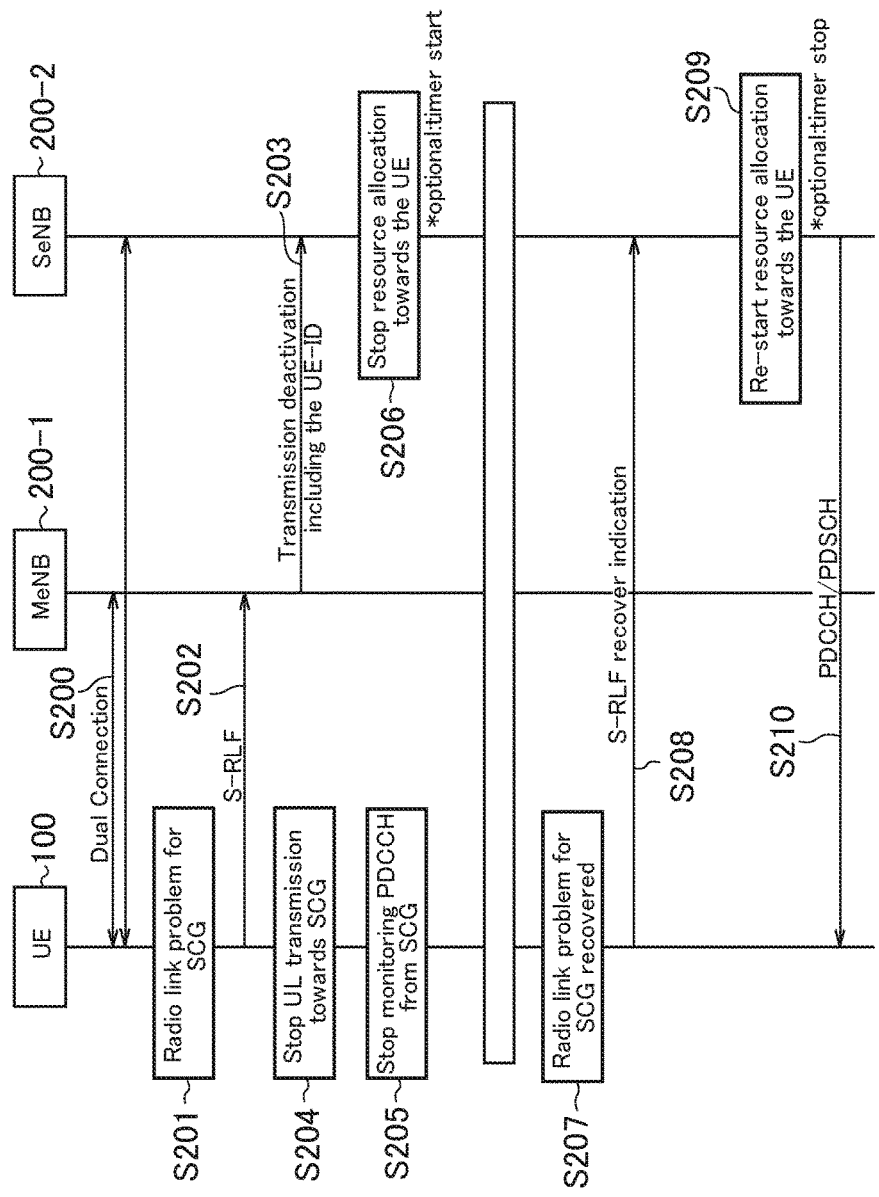

COMMUNICATION CONTROL METHOD, BASE STATION, AND USER TERMINAL

TECHNICAL FIELD

The present invention relates to a communication control method, a base station, and a user terminal, used in a mobile communication system.

BACKGROUND ART

3GPP (3rd Generation Partnership Project), which is a project aiming to standardize a mobile communication system, plans to introduce a dual connectivity scheme (Dual connectivity) in Release 12 and onward (see Non Patent Document 1). In the dual connectivity scheme, a user terminal simultaneously establishes a connection with a plurality of base stations. A user terminal is allocated, from each base station, with radio resources, and thus, it is possible to expect an improvement in throughput.

In the dual connectivity scheme, of the plurality of base stations that establish a connection with the user terminal, only one base station (hereinafter, called "master base station") establishes an RRC connection with the user terminal. On the other hand, of the plurality of base stations, another base station (hereinafter, called "secondary base station") provides additional radio resources to the user terminal without establishing an RRC connection with the user terminal. It is noted that the dual connectivity scheme may also be called an inter-base station carrier aggregation (inter-eNB CA).

PRIOR ART DOCUMENT

Non-Patent Document

Non Patent Document 1; 3GPP technical report "TR 36.842 V12.0.0" Jan. 7, 2014

SUMMARY OF THE INVENTION

A communication control method according to one embodiment comprises controlling a dual connectivity communication using a master base station configured to establish an RRC connection with a user terminal and a secondary base station configured to provide additional radio resources to the user terminal. The controlling comprises the steps of: detecting, by the user terminal, a radio link failure between the user terminal and the secondary base station; reporting, by the user terminal, the radio link failure to the master base station; and transmitting, by the master base station, a stop instruction signal to the secondary base station.

BRIEF DESCRIPTION OF THE DRAWINGS

FIG. 8 is a sequence diagram according to the first embodiment.

FIG. 9 is a sequence diagram according to the second embodiment.

DESCRIPTION OF THE EMBODIMENT

[Overview of Embodiments]

Figure 1:
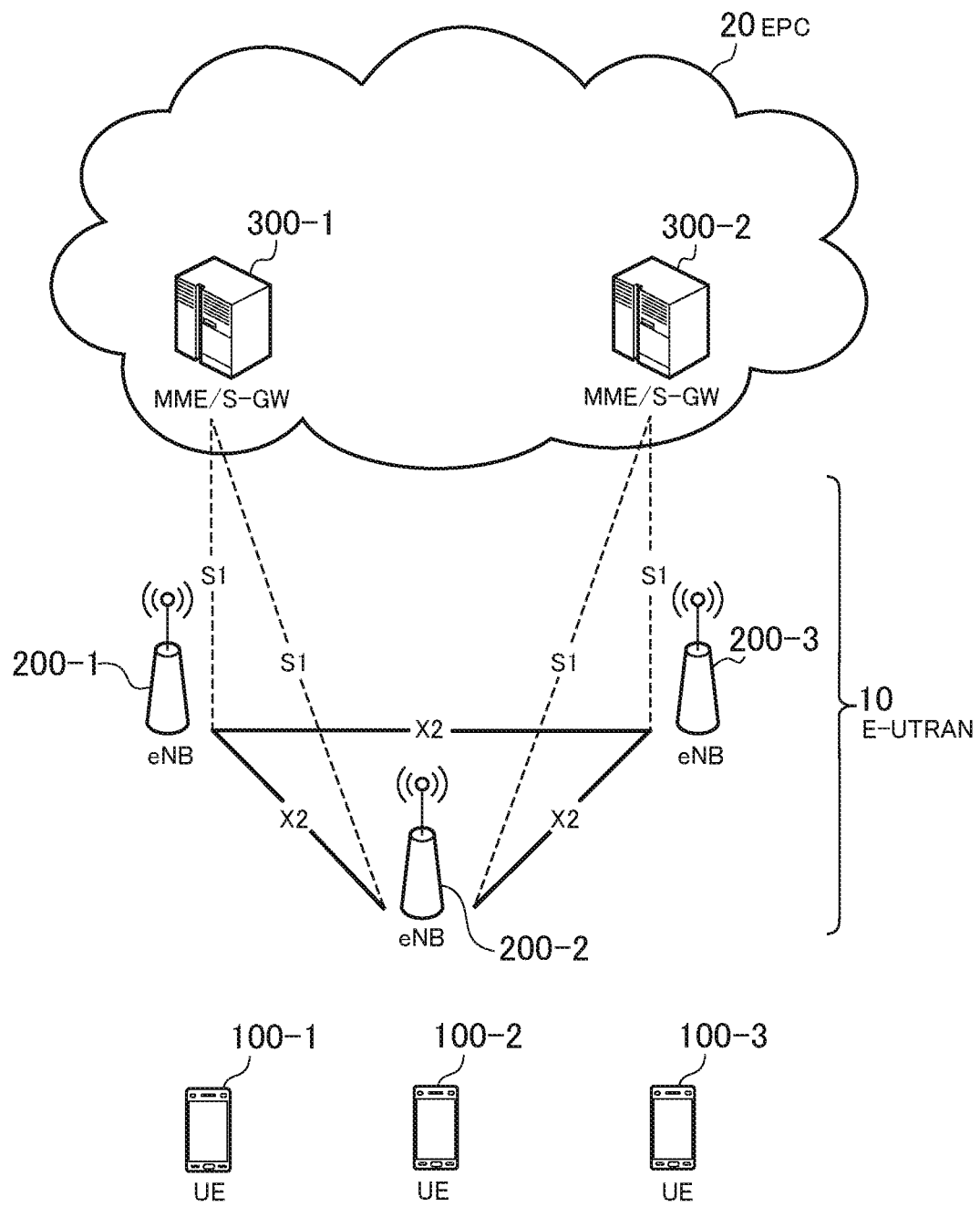
FIG. 1 is a configuration diagram of an LTE system according to a first embodiment and a second embodiment.

A communication control method according to embodiments comprises controlling a dual connectivity communication using a master base station configured to establish an RRC connection with a user terminal and a secondary base station configured to provide additional radio resources to the user terminal. The controlling comprises the steps of: detecting, by the user terminal, a radio link failure between the user terminal and the secondary base station; reporting, by the user terminal, the radio link failure to the master base station; and transmitting, by the master base station, a stop instruction signal to the secondary base station.

In the communication control method according to the embodiments, the master base station transmits, upon receipt of a report on the radio link failure, the stop instruction signal to the secondary base station. The stop instruction signal is a signal to instruct a transmission stop of downlink data to the user terminal.

In the communication control method according to embodiments, the stop instruction signal includes information to identify the user terminal.

In the communication control method according to embodiments, the secondary base station stops, when receiving the stop instruction signal, transmission of the downlink data to the user terminal.

In the communication control method according to embodiments, the secondary base station initializes a timer when receiving the stop instruction signal. The secondary base station holds the downlink data toward the user terminal until a time counted by the timer exceeds a predetermined time.

In the communication control method according to embodiments, the user terminal recovers the radio link. The user terminal notifies a recovery of the radio link to the master base station. The master base station transmits, to the secondary base station, a recovery report signal to report the recovery of the radio link.

In the communication control method according to embodiments, the user terminal recovers the radio link. The user terminal transmits, to the secondary base station, a recovery report signal to report the recovery of the radio link.

In the communication control method according to embodiments, the recovery report signal includes information to identify the user terminal.

In the communication control method according to embodiments, the secondary base station resumes, when receiving the recovery report signal, transmission of the downlink data toward the user terminal.

In the communication control method according to embodiments, the secondary base station stops, when receiving the recovery report signal, a timer initialized along with the radio link failure.

A base station according to the embodiments comprises a controller configured to perform, in dual connectivity communication using a master base station configured to establish an RRC connection with a user terminal and a secondary base station configured to provide additional radio resources to the user terminal, a process to operate as the master base station. The controller receives, from the user terminal, a report on a radio link failure between the user terminal and the secondary base station, and transmits a stop instruction signal to the secondary base station.

A base station according to the embodiments comprises a controller configured to perform, in dual connectivity communication using a master base station configured to establish an RRC connection with a user terminal and a secondary base station configured to provide additional radio resources to the user terminal, a process to operate as the secondary base station. The controller receives a stop instruction signal from the master base station, and stops, upon receipt of the instruction signal, transmission of downlink data toward the user terminal.

A user terminal according to the embodiments comprises: a controller configured to perform, in dual connectivity communication using a master base station configured to establish an RRC connection with a user terminal and a secondary base station configured to provide additional radio resources to the user terminal, a process to operate as the user terminal. The controller detects a radio link failure between the user terminal and the secondary base station, reports the radio link failure to the master base station, and reports, when the radio link is recovered, on the recovery to the master base station or the secondary base station.

[First Embodiment]

Embodiment of applying the present invention to the LTE system will be described below.

(System Configuration)

FIG. 1 is a configuration diagram of an LTE system according to a first embodiment.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user data. MME/S-GW 300 is connected to eNB 200 via an S1 interface.

Figure 2:
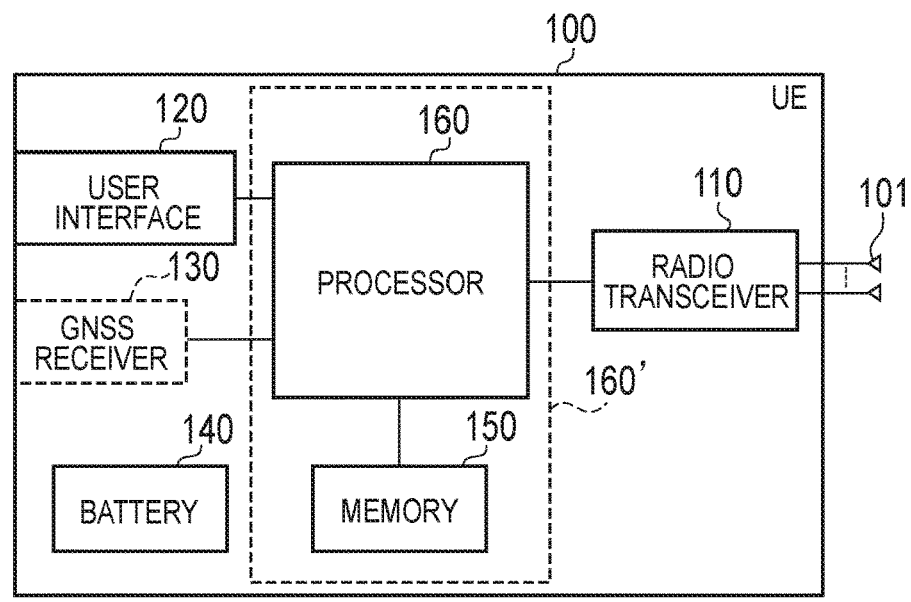
FIG. 2 is a block diagram of a UE according to the first embodiment and the second embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 corresponds to a storage. The processor 160 and the memory 150 constitute a controller. The UE 100 may not have the GNSS receiver 130. Furthermore, the memory 150 may be integrally formed with the processor 160, and this set (that is, a chip set) may be called a processor 160'.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
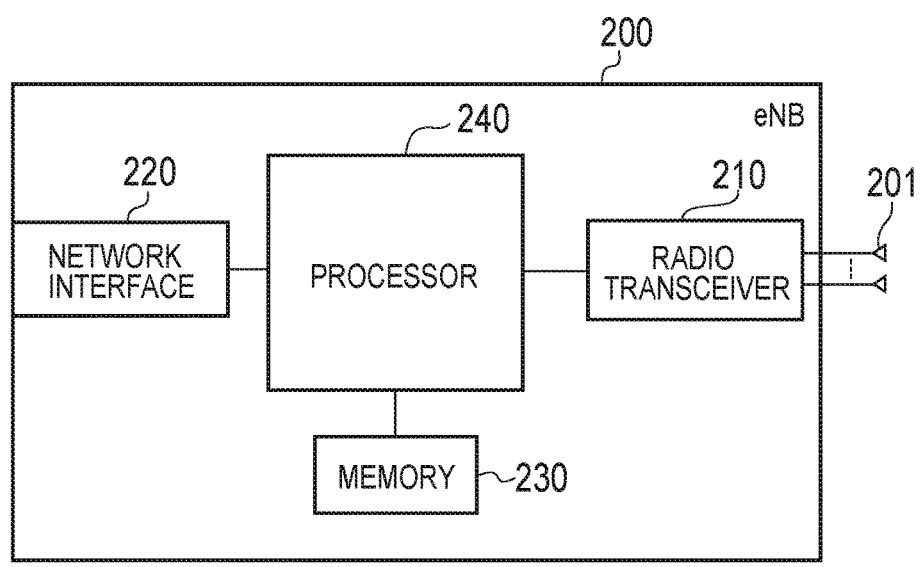
FIG. 3 is a block diagram of an eNB according to the first embodiment and the second embodiment.

FIG. 3 is a block diagram of the eNB 200. As illustrated in FIG. 3, the eNB 200 includes plural antennas 201, a radio transceiver 210, a network interface 220, a memory 230, and a processor 240. The memory 230 and the processor 240 constitute a controller. Furthermore, the memory 230 may be integrally formed with the processor 240, and this set (that is, a chip set) may be called a processor.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
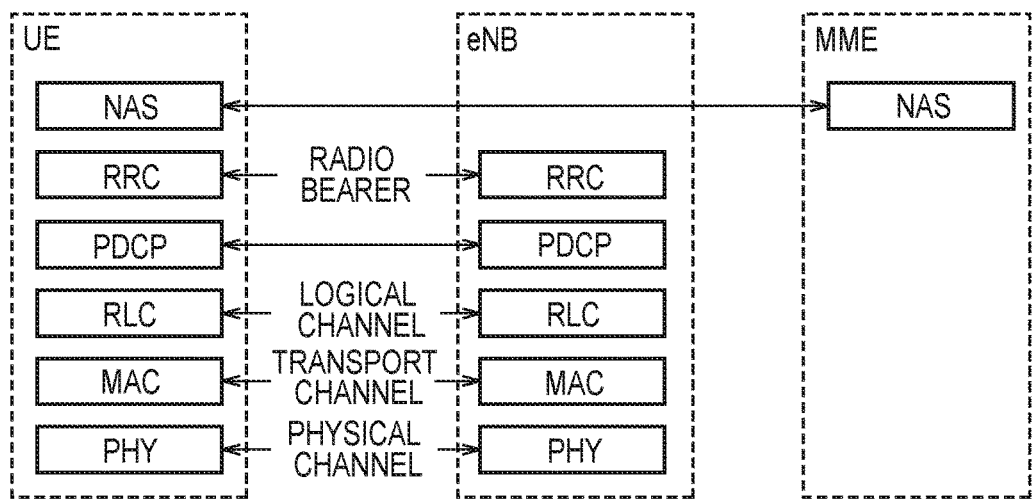
FIG. 4 is a protocol stack diagram of a radio interface according to the first embodiment and the second embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, use data and control signal are transmitted via the physical channel.

The MAC layer performs priority control of data, a retransmission process by hybrid ARQ (HARQ), a random access procedure at the time of RRC connection establishment, and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in an RRC connected state, otherwise the UE 100 is in an RRC idle state.

A NAS (Non-Access Stratum) layer positioned above the RRC layer performs a session management, a mobility management and the like.

In the LTE system, OFDMA (Orthogonal Frequency Division Multiple Access) is applied to a downlink, and SC-FDMA (Single Carrier Frequency Division Multiple Access) is applied to an uplink, respectively.

The radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RB) in a frequency direction, and a plurality of symbols in the time direction. The resource block includes a plurality of subcarriers in the frequency direction. Among radio resources (time-frequency resources) assigned to the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a control signal. Furthermore, the other portion of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. The remain portion of each subframe is a region available as a physical uplink shared channel (PUSCH) for mainly transmitting user data.

(Dual Connectivity Scheme)

The LTE system according to the first embodiment supports a dual connectivity scheme. The dual connectivity scheme is expected to be introduced in Release 12 and onward. In the dual connectivity scheme, the UE 100 simultaneously establishes a connection with a plurality of eNBs 200. The UE 100 is allocated, from each eNB 200, with radio resources, and thus, it is possible to expect an improvement in throughput. It is noted that the dual connectivity scheme may be called a carrier aggregation between eNBs 200 (inter-eNB CA).

Figure 5:
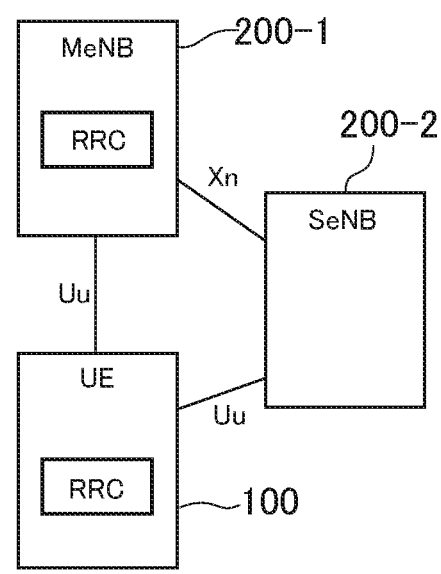
FIG. 5 is a configuration diagram of a user terminal and a radio base station according to the first embodiment and the second embodiment.

FIG. 5 is a diagram for describing an overview of a dual connectivity scheme.

As shown in FIG. 5, in the dual connectivity scheme, of the plurality of eNBs 200 that establish a connection with the UE 100, only a master eNB (MeNB) 200-1 establishes an RRC connection with the UE 100. On the other hand, of the plurality of eNBs 200, a secondary eNB (SeNB) 200-2 provides additional radio resources to the UE 100 without establishing an RRC connection with the UE 100. In other words, the MeNB 200-1 establishes not only a user plane connection, but also a control plane connection with the UE 100. On the other hand, the SeNB 200-2 establishes a user plane connection with the UE 100, without establishing a control plane connection with the UE 100. An Xn interface is set between the MeNB 200-1 and the SeNB 200-2. The Xn interface is either an X2 interface or a new interface.

FIG. 6(a) to FIG. 7(b) are diagrams for explaining a configuration format of the transfer route (data path) of user data in a dual connectivity scheme. There are main two types of user plane architecture (UP architecture) constituting the transfer route (data path) of user data in the dual connectivity scheme.

Figure 6A:
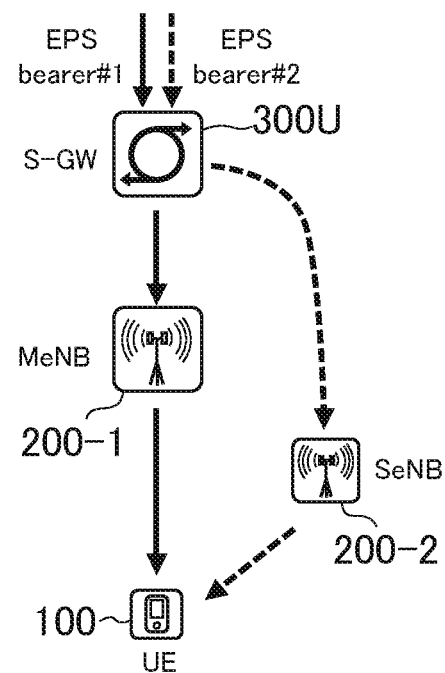
FIGS. 6(a) and 6(b) are diagrams showing a first UP architecture.
Figure 6B:
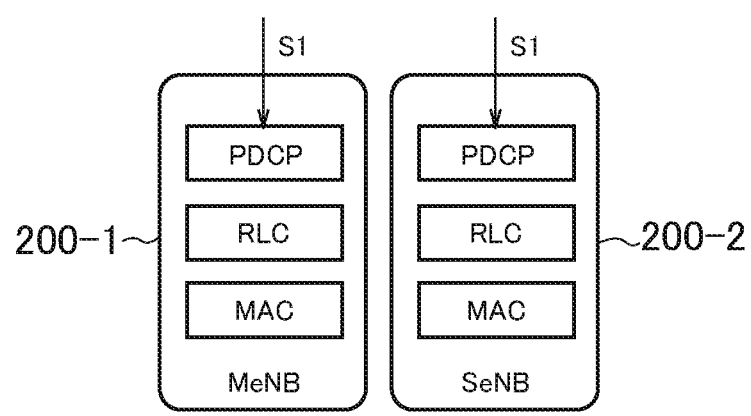

FIGS. 6(a) and 6(b) show a first UP architecture. As shown in FIG. 6(a), in the first UP architecture, an S1-U interface between the MeNB 200-1 and the S-GW 300U, and an S1-U interface between the SeNB 200-2 and the S-GW 300U are used. An EPS bearer #1 between the UE 100 and the P-GW passes through the S1-U interface between the MeNB 200-1 and the S-GW 300U. An EPS bearer #2 between the UE 100 and the P-GW passes through the S1-U interface between the SeNB 200-2 and the S-GW 300U. Thus, in the first UP architecture, the data path between the SeNB 200-2 and the S-GW 300U does not pass through the MeNB 200-1. As shown in FIG. 6(b), each of the MeNB 200-1 and the SeNB 200-2 performs a process in each layer of the PDCP, the RLC, and the MAC.

Figure 7A:
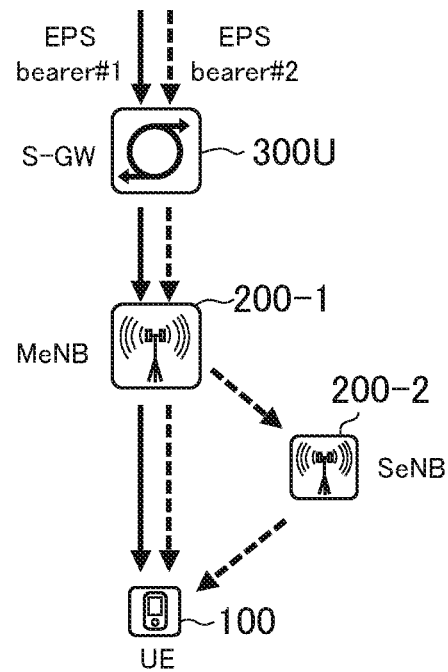
FIGS. 7(a) and 7(b) are diagrams showing a second UP architecture.
Figure 7B:
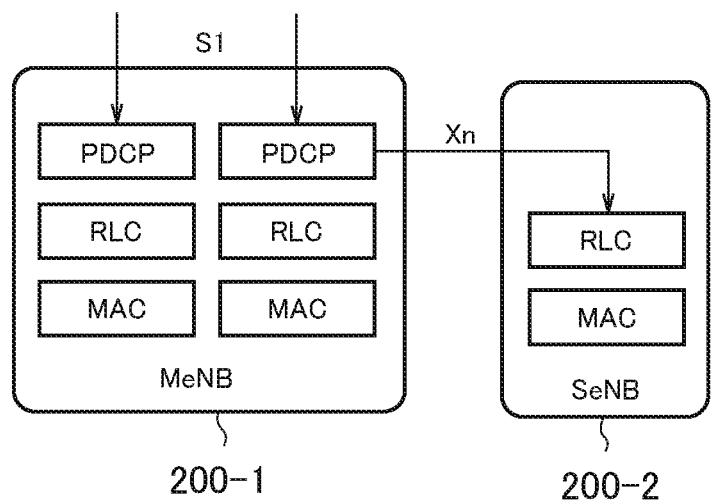

FIGS. 7(a) and 7(b) show a second UP architecture. As shown in FIG. 7(a), in the second UP architecture, the EPS bearer #2 between the UE 100 and the P-GW is split in the MeNB 200-1, and while one of the split parts (a split bearer) terminates in the UE 100 after passing through the SeNB 200-2, the other split part (a split bearer) terminates in the UE 100 without passing through the SeNB 200-2. Thus, in the second UP architecture, the data path between the SeNB 200-2 and the S-GW 300U passes through the MeNB 200-1. As shown in FIG. 7(b), for one of the split parts (the split bearer) in the EPS bearer #2, the process in each layer is performed by the PDCP of the MeNB 200-1, and the RLC and the MAC of the SeNB 200-2. It is noted that in the split bearer, the MeNB may take charge the process up to the RLC (or some functions of the RLC).

(Operation During Radio Link Failure)

Next, an operation during a radio link failure between the SeNB 200-2 and the UE 100 will be described.

The UE 100 detects a radio link failure in between with a cell subordinate to the SeNB 200-2 (S-RLF) by L1-out-of-sync (T310 expire), RACH failure, and RLC failure. When detecting the S-RLF, the UE 100 reports the occurrence of the S-RLF to the MeNB 200-1. The report also includes a trigger by which the S-RLF is detected.

When the S-RLF occurs, the UE 100 stops the uplink data transmission toward the SeNB 200-2. Further, the UE 100 stops monitoring the PDCCH of the cell of the SeNB 200-2 in which the S-RLF occurs. On the other hand, the UE 100 continues the uplink data transmission toward the MeNB 200-1.

Here, if the SeNB 200-2 is not notified, when the S-RLF occurs, that the S-RLF occurs, then the SeNB 200-2 may implement allocation of the downlink resource toward the UE 100 and transmission of the downlink data theretoward.

In the case of the first UP architecture of FIGS. 6(*a*) and 6(*b*) (an SCG), if the occurrence of the S-RLF is not notified, the S-GW may transmit the downlink data to the SeNB 200-2 and the SeNB 200-2 may allocate the resource for downlink data transmission.

Further, in the case of the second UP architecture of FIGS. 7(*a*) and 7(*b*) (the Split Bearer), there is the downlink data which is held in the SeNB 200-2 as a result of being already transferred from the MeNB 200-1 to the SeNB 200-2 even when the MeNB 200-1 recognizes the occurrence of the S-RLF. The SeNB 200-2 may allocate, for these downlink data, the resource for the downlink data transmission.

Therefore, in the communication control method according to the present embodiment, the MeNB 200-1 transmits, to the SeNB 200-2, a stop instruction signal for temporarily stopping the allocation of the resource for the downlink data transmission and the transmission of the downlink data. The stop instruction signal may be an Indication indicating that the allocation of the resource for the downlink data transmission and the transmission of the downlink data are temporarily stopped.

The stop instruction signal is transmitted when the MeNB 200-1 receive, as a trigger, an occurrence notification of the S-RLF from the UE 100.

Further, the stop instruction signal includes information with which it is possible to identify the UE 100 so that it is possible for the SeNB 200-2 to specify the UE 100 in which the S-RLF has occurred. The information with which it is possible to identify the UE 100 is information, such as an IMSI, a TMSI, and an RNTI, with which it is possible for the SeNB 200-2 to uniquely specify the UE 100.

Upon receipt of the stop instruction signal, the SeNB 200-2 stops the resource allocation to the downlink data destined to the UE 100 accumulated in the SeNB 200-2 and transmission of the downlink data.

Even when the S-RLF occurs, the radio link between the UE 100 and the SeNB 200-2 may be recovered. Thus, the SeNB 200-2 holds the accumulated downlink data toward the UE 100 and newly transferred downlink data toward the UE 100.

Here, it is not preferable that the SeNB 200-2 continues accumulating the downlink data in view of a buffer capacity or the like of the SeNB 200-2. Thus, the SeNB 200-2 may initiate a timer when receiving the stop instruction signal from the MeNB 200-1 and delete the held data when a value of the timer exceeds a predetermined threshold value. The SeNB 200-2 may stop the timer along with the deletion of the data.

(Operation when Radio Link is Recovered)

When an S-RLF occurs, the UE 100 attempts to repair the radio link between the UE 100 and the SeNB 200-2. When having repaired the radio link (having repaired the S-RLF), the UE 100 reports to the MeNB 200-1 that the SRLF has been repaired.

Upon receipt of the report from the UE 100 that the S-RLF has been repaired, the MeNB 200-1 transmits, to the SeNB 200-2, a recovery report signal that is a signal for resuming the allocation of the downlink resource toward the UE 100 and the transmission of the downlink data theretoward. The recovery report signal may be an Indication indicating the resumption of the allocation of the downlink resource and the transmission of the downlink data.

The resumption signal includes information with which it is possible to identify the UE 100 so that it is possible to specify the UE 100 toward which the allocation of the downlink resource and the transmission of the downlink data are resumed. The information with which it is possible to identify the UE 100 is information, such as an IMSI, a TMSI, and an RNTI, with which it is possible for the SeNB 200-2 to uniquely specify the UE 100.

Upon receipt of the resumption signal, the SeNB 200-2 resumes the allocation of the downlink resource toward the UE 100 and the transmission of the downlink data theretoward.

Here, when the timer is already initialized upon receipt of the stop instruction signal from the MeNB 200-1, the timer may be stopped.

(Flow from Radio Link Failure Detection to Recovery)

Using FIG. 8, a flow from a radio link failure detection to a recovery in an S-RLF will be described.

In the dual connectivity scheme, the UE 100 establishes the connection with both the MeNB 200-1 and the SeNB 200-2 (S100: Dual Connection).

The UE 100 detects a radio link failure between the UE 100 and a cell (SCG) subordinate to the SeNB 200-2 (S101: Radio link problem for SCG).

The UE 100 reports, to the MeNB 200-1, the radio link failure in between with the cell (SCG) subordinate to the SeNB 200-2 (S102: S-RLF report).

Upon receipt of the report on the S-RLF from the UE 100, the MeNB 200-1 transmits, to the SeNB 200-2, a stop instruction signal to instruct stop of the allocation of the downlink resource toward the UE 100 and the transmission of the downlink data theretoward (S103: Transmission deactivation including the UE-ID). Here, the stop instruction signal includes an identifier of the UE 100, the identifier being information with which it is possible to uniquely specify the UE 100.

On the other hand, the UE 100 stops transmission of uplink data toward the cell subordinate to the SeNB 200-2 (SCG) (S104: Stop UL transmission toward SCG). Further, the UE 100 stops monitoring a physical control channel of the cell (SCG) subordinate to the SeNB 200-2 (S105: Stop monitoring PDCCH for SCG).

Upon receipt of the stop instruction signal, the SeNB 200-2 stops the allocation of the downlink resource toward the UE 100 and the transmission of the downlink data theretoward (S106: Stop resource allocation towards UE). Here, the SeNB 200-2 may initialize the timer. The SeNB 200-2 may operate to hold the downlink data toward the UE 100 until a value of the timer exceeds a predetermined threshold value, and to delete the downlink data toward the UE 100 when the value exceeds the threshold value.

The UE 100 recovers the radio link between the UE 100 and the SeNB 200-2 (S107: Radio link problem for SCG recovered), and reports the recovery of the radio link to the MeNB 200-1 (S108: S-RLF recovery indication).

Upon receipt of the recovery report on the radio link, the MeNB 200-1 transmits, to the SeNB 200-2, a recovery report signal that is a signal to resume the downlink data transmission toward the UE 100 and to resume the allocation of the downlink resource theretoward (S109: Transmission activation including the UE-ID). It is noted that S109 includes an identifier of the UE 100, the identifier being information with which it is possible to uniquely specify the UE 100.

Upon receipt of the recovery report signal, the SeNB 200-2 resumes the transmission of the downlink data and the allocation of the downlink resource (S110: Re-start resource allocation towards the UE). Here, the recovery report signal includes an identifier of the UE 100, the identifier being information with which it is possible to uniquely specify the UE 100. Here, the SeNB 200-2 may stop the timer.

The SeNB 200-2 uses the PDSCH to resume the transmission of the downlink data, and the UE 100 resumes monitoring the PDCCH (S111: PDCCH/PDSCH).

[Second Embodiment]

Hereinafter, a second embodiment will be described. The description of parts in common with the first embodiment will be omitted, and a difference only therebetween will be described.

(Operation when Radio Link is Recovered)

In the present embodiment, the UE 100 directly reports the recovery of the radio link to the SeNB 200-2, rather than to the MeNB 200-1, when the radio link between the UE 100 and the SeNB 200-2 is recovered.

The SeNB 200-2 that has received the recovery report of the radio link resumes the transmission of the downlink data toward the UE 100 and the allocation of the downlink resource theretoward.

(Sequence During Radio Link Recovery)

By using FIG. 9, a sequence according to the present embodiment will be described.

In the present embodiment, the UE 100 directly reports the recovery of the radio link to the SeNB 200-2 (S208: S-RLF recovery indication).

The SeNB 200-2 that has received the report on the recovery of the radio link resumes the downlink data transmission toward the UE 100 and the allocation of the downlink resource theretoward (S209: Re-start resource allocation towards the UE).

The rest of the operation is in much the same way as in the first embodiment.

[Other Embodiments]

In the described-above embodiment, although an LTE system is described as an example of a mobile communication system, the present invention is not limited to the LTE system and may be applied to a system other than the LTE system.

The entire content of Japanese Patent Application No. 2014-095880 (filed on May 7, 2014) is incorporated in the present specification by reference.

INDUSTRIAL APPLICABILITY

The present invention is useful in the field of communication.

The invention claimed is:

1. A communication control method, comprising: controlling a dual connectivity communication using a master base station configured to establish an RRC connection with a user terminal and a secondary base station configured to provide additional radio resources to the user terminal, wherein the controlling comprises the steps of:
   detecting, by the user terminal, a radio link failure between the user terminal and the secondary base station;
   reporting, by the user terminal, the radio link failure to the master base station;
   transmitting, by the master base station, a stop instruction signal to the secondary base station; and
   when receiving, by the secondary base station, the stop instruction signal from the master base station:
   stopping, by the secondary base station, transmission of downlink data to the user terminal;
   initializing, by the secondary base station, a timer for holding downlink data addressed to the user terminal;
   in a case that the radio link between the user terminal and the secondary base station is not recovered, holding, by the secondary base station, the downlink data addressed to the user terminal, until the timer exceeds a predetermined threshold value; and
   deleting, by the secondary base station, the downlink data addressed to the user terminal, in a case that the timer exceeds the predetermined threshold value.

2. The communication control method according to claim 1, wherein
   the master base station transmits, upon receipt of a report on the radio link failure, the stop instruction signal to the secondary base station, and
   the stop instruction signal is a signal to instruct a transmission stop of downlink data to the user terminal.

3. The communication control method according to claim 1, wherein
   the stop instruction signal includes information to identify the user terminal.

4. The communication control method according to claim 3, wherein
   the secondary base station stops, when receiving the stop instruction signal, transmission of the downlink data to the user terminal.

5. The communication control method according to claim 4, wherein
   the secondary base station initializes the timer when receiving the stop instruction signal, and
   the secondary base station holds the downlink data toward the user terminal until a time counted by the timer exceeds the predetermined threshold value.

6. The communication control method according to claim 1, wherein
   the user terminal recovers the radio link, and
   the user terminal notifies a recovery of the radio link to the master base station, and
   the master base station transmits, to the secondary base station, a recovery report signal to report the recovery of the radio link.

7. The communication control method according to claim 6, wherein
   the recovery report signal includes information to identify the user terminal.

8. The communication control method according to claim 6, wherein the secondary base station resumes, when receiving the recovery report signal, transmission of the downlink data toward the user terminal.

9. The communication control method according to claim 6, wherein
the secondary base station stops, when receiving the recovery report signal, the timer initialized along with the radio link failure.

10. The communication control method according to claim 1, wherein
the user terminal recovers the radio link, and
the user terminal transmits, to the secondary base station, a recovery report signal to report the recovery of the radio link.

11. A master base station, comprising: a controller configured to perform, in dual connectivity communication using the master base station configured to establish an RRC connection with a user terminal and a secondary base station configured to provide additional radio resources to the user terminal, a process to operate as the master base station, wherein
the controller is further configured to:
receive, from the user terminal, a report on a radio link failure between the user terminal and the secondary base station, and
transmit a stop instruction signal to the secondary base station, wherein
in response to receiving, by the secondary base station, the stop instruction signal from the master base station, the secondary base station:
stops transmission of downlink data to the user terminal;
initializes a timer for holding downlink data addressed to the user terminal;
in a case that the radio link between the user terminal and the secondary base station is not recovered, holds the downlink data addressed to the user terminal until the timer exceeds a predetermined threshold value; and
in a case that the timer exceeds the predetermined threshold value, deletes the downlink data addressed to the user terminal.

12. A secondary base station, comprising: a controller configured to perform, in dual connectivity communication using a master base station configured to establish an RRC connection with a user terminal and the secondary base station configured to provide additional radio resources to the user terminal, a process to operate as the secondary base station, wherein
the controller is further configured to:
receive a stop instruction signal from the master base station, when the master base station receives indication of a radio link failure from the user terminal, and
upon receiving the stop instruction signal from the master base station:
stop transmission of downlink data toward the user terminal;
initialize a timer for holding downlink data addressed to the user terminal;
in a case that the radio link between the user terminal and the secondary base station is not recovered, hold the downlink data addressed to the user terminal until the timer exceeds a predetermined threshold value; and
in a case that the timer exceeds the predetermined threshold value, delete the downlink data addressed to the user terminal.

13. A user terminal, comprising: a controller configured to perform, in dual connectivity communication using a master base station configured to establish an RRC connection with a user terminal and a secondary base station configured to provide additional radio resources to the user terminal, a process to operate as the user terminal, wherein
the controller is further configured to:
detect a radio link failure between the user terminal and the secondary base station,
report the radio link failure to the master base station, wherein the radio link failure report prompts the master base station to transmit a stop instruction signal to the secondary base station, the stop instruction signal instructing the secondary base station to stop transmission of downlink data to the user terminal, and
report, in a case that the radio link is recovered, on the recovery to the master base station or the secondary base station, wherein
in a case that the radio link between the user terminal and the secondary base station is not recovered, the secondary base station holds downlink data addressed to the user terminal until a timer for holding downlink data addressed to the user terminal exceeds a predetermined threshold value, wherein the timer is initialized by the secondary base station upon receiving the stop instruction signal from the master base station; and
in a case that the timer exceeds the predetermined threshold value, the secondary base station deletes the downlink data addressed to the user terminal.

* * * * *